United States Patent [19]
Schaefer

[11] Patent Number: 5,947,235
[45] Date of Patent: Sep. 7, 1999

[54] SYSTEM AND METHOD OF EXHAUST BRAKE CONTROL

[75] Inventor: Norman Schaefer, Pleasant Valley, Conn.

[73] Assignee: Diesel Engine Retarders, Inc., Wilmington, Del.

[21] Appl. No.: 08/754,045

[22] Filed: Dec. 4, 1996

[51] Int. Cl.$^6$ .................................................. B60T 11/10
[52] U.S. Cl. ........................................ 188/154; 123/323
[58] Field of Search ................................ 188/154, 273, 188/106 P; 303/3, 4, 15, 12, 14, 6.01; 123/323

[56] References Cited

U.S. PATENT DOCUMENTS

| | | | |
|---|---|---|---|
| 4,748,812 | 6/1988 | Okada et al. ............................ | 60/614 |
| 5,193,657 | 3/1993 | Iizuka ...................................... | 123/323 X |
| 5,445,248 | 8/1995 | Clarke et al. ........................... | 188/273 |
| 5,516,200 | 5/1996 | Tezuka et al. .......................... | 188/273 |

*Primary Examiner*—Robert J. Oberleitner
*Assistant Examiner*—Mariano Sy
*Attorney, Agent, or Firm*—Collier, Shannon Rill & Scott, PLLC; David R. Yohannan

[57] ABSTRACT

A system and method for controlling a vacuum operated exhaust brake. A vehicle may be provided with service brake assistance and an exhaust brake, each of which may be driven by a common vacuum source. In the event the available vacuum is likely to be insufficient to meet the demand of the service brake assistance system, the exhaust brake may be selectively isolated from the vacuum source. Exhaust brake isolation may be responsive to a sensed vacuum parameter, such as the magnitude of the vacuum and/or the rate of change of the vacuum. Vacuum communication between the exhaust brake and the vacuum source may be reestablished responsive to the sensed vacuum parameter.

24 Claims, 2 Drawing Sheets

SYSTEM AND METHOD OF EXHAUST BRAKE CONTROL

FIELD OF THE INVENTION

The present invention relates to vacuum actuated vehicle exhaust brakes and methods of control thereof. More specifically, the present invention relates to a system and method of prioritizing the distribution of available vacuum between an exhaust brake and one or more other vacuum driven vehicle subsystems, such as vehicle service brakes.

BACKGROUND OF THE INVENTION

Presently, it is not uncommon for vehicles, such as trucks and buses, to be equipped with both service brakes and an exhaust brake. The use of an exhaust brake in combination with service brakes may lighten the load, so to speak, for the service brakes, thereby increasing the life and decreasing the maintenance cost of the service brakes.

Exhaust brakes have been known for quite some time. Many exhaust brakes, such as the brake disclosed in Okada et al., U.S. Pat. No. 4,748,812 (issued Jun. 7, 1988) for a Turbo Compound Engine, are actuated by a fluid driven actuator. Fluid driven actuators, however, require the maintenance of a special fluid reservoir and hydraulic system dedicated to the exhaust brake. Since most exhaust brakes need only have two positions, fully open and fully closed, complicated and expensive hydraulic actuators may not be required.

Other exhaust brakes, such as the one disclosed in Clarke et al., U.S. Pat. No. 5,445,248 (issued Aug. 29, 1995) for an Exhaust Brake, may use a pneumatic actuator for the exhaust brake. The pneumatic actuator may open and close a valve, such as a butterfly valve, in the brake. The pneumatic actuator in the Clarke patent comprises a piston and chamber. The piston is drawn in and out of the chamber by varying the pressure within the chamber. The drawing in and out of the piston is, in turn, used to open and close a circular butterfly valve just downstream of an exhaust brake elbow.

Pneumatic actuators for an exhaust brake may be driven by a vacuum supply included in the vehicle in which the exhaust brake is installed. The vacuum supply used to drive the actuator may be the same supply used for control, assistance, and/or activation of the service brakes of the vehicle (as well as other vacuum actuated subsystems, such as heating and air conditioning). Due to the limits of the pump used to provide the vacuum supply, the combined vacuum requirements of the exhaust brake and service brake may exceed the vacuum capacity of the vacuum supply. Because the service brakes provide a much greater portion of the vehicle braking power, the service brakes must be given priority over the exhaust brake should the vacuum supply be deficient for both types of brakes.

The aforementioned vacuum deficiency problem may be particularly acute when the vehicle is operated at higher altitudes. The operation of the vehicle at higher altitudes decreases the vacuum capabilities of the vehicle's vacuum pump. The higher the altitude, the lower the strength of the vacuum produced by like powered pumps. High altitudes also increase the pull down time of the pump; i.e. the time it takes the pump to achieve a particular level of vacuum starting from ambient pressure.

Systems have been devised to control the operation of combination exhaust brakes and service brakes. Tezuka et al. U.S. Pat. No. 5,516,200 (issued May 14, 1996) for a Controller for Tractor Trailer Braking Devices, discloses an integrated system for controlling the operation of service brakes power assistance, an exhaust brake, a tractor retarder brake, and a trailer retarder brake. The Tezuka system enables the various vehicle braking subsystems to be selectively interlocked so that activation of one braking subsystem may be linked to the activation of another braking subsystem. The Tezuka system does not address the control problems which arise from use of service brakes and exhaust brakes activated or assisted by a common vacuum supply.

The prior art references of which the applicant is aware do not even recognize the broader safety problems which may arise as a result of having service brakes and exhaust brakes connected to any type of common pneumatic or hydraulic actuation system. Leaks or malfunctions in the exhaust brake part of the actuation system could result in interference with the service brake assist part of the actuation system. Since the service brakes are usually far more effective in braking the vehicle, interference with the activation of the service brakes needs to be avoided if possible.

Accordingly, the Applicant has determined the necessity of providing a system for controlling the connection of an exhaust brake actuator with an actuation system that is also connected to the service brakes. The control of the exhaust brake connection may be responsive to the ability of the actuation system to supply ample actuation vacuum for both the exhaust brake and assistance for the service brakes. If ample actuation is lacking, the service brakes assistance may be prioritized and the exhaust brake disconnected from the actuation system. Lack of ample actuation may be caused by reduced performance of the driving force of the actuation system, or by the development of leaks or disconnection in the elements connecting the actuation system and the exhaust brake.

More specifically, the Applicant has discovered the necessity of a system for controlling the connection of an exhaust brake actuator with a vacuum supply. The control of the exhaust brake connection may be responsive to the level of vacuum, the pull down time of the vacuum pump, or the vacuum flow rate. The system may preferably also provide a safety mechanism which isolates the vacuum supply from the hose connecting the vacuum supply and the exhaust brake actuator should the hose or any other component in the system fail or leak.

OBJECTS OF THE INVENTION

It is therefore an object of the present invention to provide methods and apparatus to control the operation of an exhaust brake.

It is another object of the present invention to provide methods and apparatus to control communication between a vacuum operated exhaust brake and a vacuum source.

It is still another object of the present invention to provide methods and apparatus to prioritize vehicle service brakes over an exhaust brake.

It is a further object of the present invention to provide methods and apparatus to control vacuum allotment to an exhaust brake responsive to the level of a vacuum parameter.

It is yet another object of the present invention to provide a safety apparatus for a vehicle including vacuum assisted service brakes and an exhaust brake.

It is still yet another object of the present invention to control the connection of an exhaust brake actuator with an actuation system shared with another engine or vehicle subsystem.

Additional objects and advantages of the invention are set forth, in part, in the description which follows and, in part, will be apparent to one of ordinary skill in the art from the description and/or from the practice of the invention.

SUMMARY OF THE INVENTION

In response to the foregoing challenge, Applicant has developed an innovative and economical actuation system in a vehicle for providing actuation of an exhaust brake and at least one other vehicle subsystem, comprising: means for sensing a parameter indicating the magnitude of available actuation; and means for selectively isolating the exhaust brake from the actuation system responsive to the parameter sensed by the means for sensing.

Applicant has also developed an innovative and economical system for selectively isolating the exhaust brake from a vacuum source, comprising: means for sensing a parameter of the available vacuum provided by the vacuum source; and means for selectively isolating the exhaust brake from the vacuum source responsive to the vacuum parameter sensed by the means for sensing.

Applicant has further developed an innovative and economical method of providing selective pneumatic communication between the vacuum source and the exhaust brake comprising the steps of: sensing a parameter of the vacuum provided by the vacuum source; and selectively disabling pneumatic communication between the vacuum source and the exhaust brake responsive to the sensed vacuum parameter.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention, and together with the detailed description serve to explain the principles of the present invention.

DETAILED DESCRIPTION OF THE PREFERRED EMBODIMENTS

Figure 1:
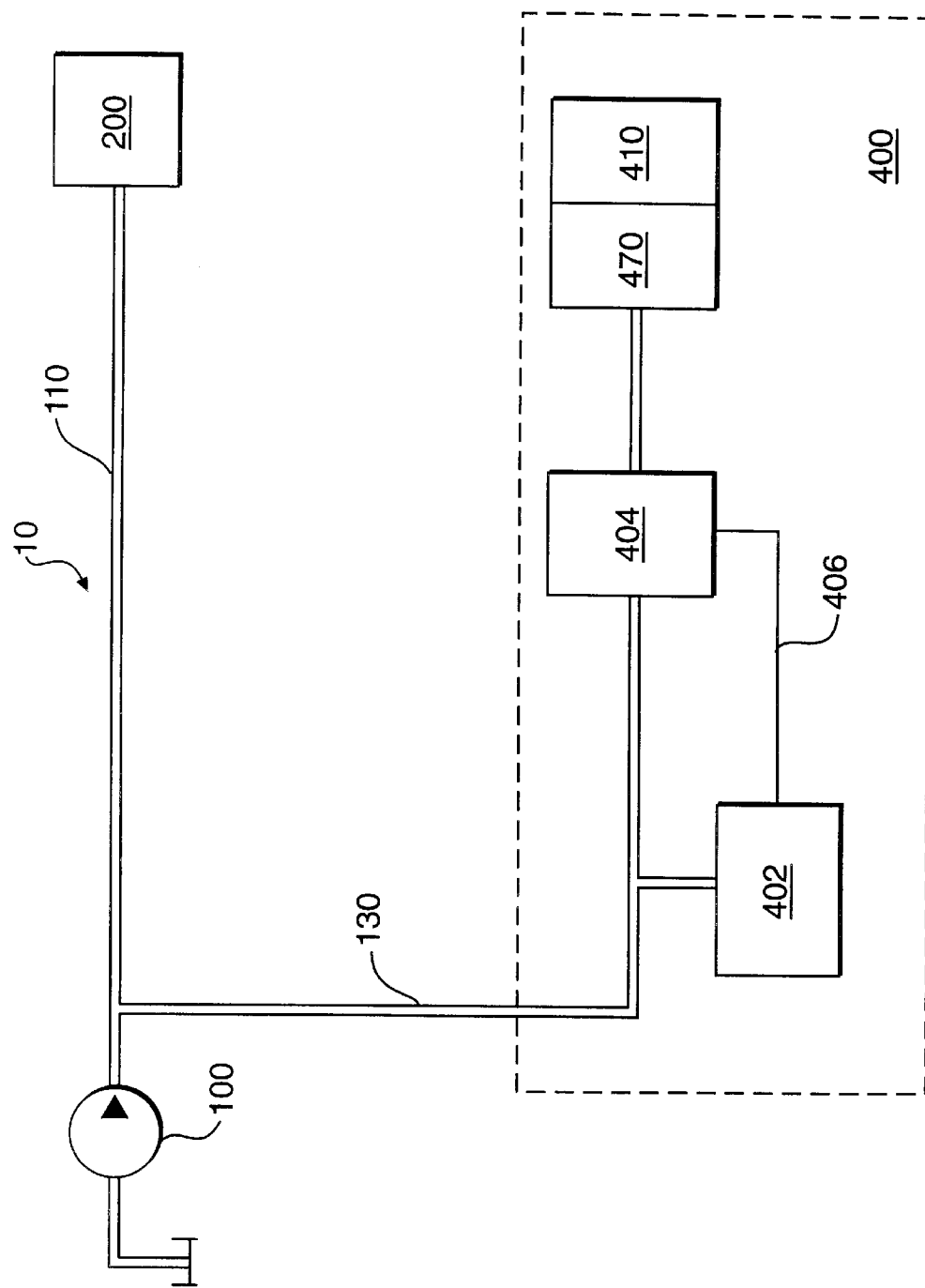
FIG. 1 is a schematic diagram of a first embodiment of the pneumatic and communications linkage systems of the invention.

Reference will now be made in detail to a first embodiment of the present invention, an example of which is illustrated in the accompanying drawings. The first embodiment of the present invention is illustrated by the vacuum supply and actuation system 10 shown in FIG. 1.

The system 10 may be provided in a vehicle having a service brake vacuum assist system 200 and an exhaust brake actuation system 400. The actuation system 10 may include a common energy source 100 for providing actuating energy via two conduits 110 and 130, respectively, to the service brake assist system 200, and the exhaust brake actuation system 400. The service brake assist system 200 and the exhaust brake actuation system may each draw a variable amount of actuating energy from the source 100. The draw of the service brake may depend upon factors such as the level of service brake assist demand, the duration of service brake assist demand, and the operation altitude of the vehicle. The actuation system 400 may also draw a variable amount of actuating energy from the source 100 depending upon the level, duration, and altitude of exhaust brake actuation.

Because the service brake assist system 200, and the exhaust brake actuation system 400 are in common communication with the source 100, the magnitude of actuating energy available for each is dependent upon the draw of the other. Further, the available actuating energy may also depend on the operating altitude of the vehicle in which the systems are disposed. For example, if the source 100 were a vacuum pump, the higher the operating altitude, the lower the magnitude of vacuum (energy) that can be provided by the pump (source) 100 and/or the greater the pump pull down time. Because vacuum availability is diminished at altitude, there is less vacuum for the systems to share.

In order to prioritize available actuating energy for the service brake assist system 200 over the exhaust brake 410, the actuation system 400 may include a means for sensing a parameter indicating the magnitude of available actuating energy 402 and a means for selectively disconnecting the exhaust brake from the energy source 404. The sensing means 402 may be provided by one of various conventional sensors which may sense a particular energy parameter, such as magnitude at the source 100, magnitude in the service brake assist system 200, rate of availability, etc. The sensing means 402 may be in communication with the disconnection means 404 via a link 406. The link 406 may be provided by various different mediums of electrical and/or mechanical communication, such as conductive wire, radio transmitter and receiver, etc.

Responsive to the sensing means' indication via link 406 that the service brake may be provided with less than adequate actuating energy, the exhaust brake actuation system 400 may be disconnected from communication with the source 100 by the disconnection means 404. The disconnection means 404 may be provided by various valves, cut off switches, etc., which may be closed responsive to receipt of an indication from the sensing means 402 that the sensed parameter has reached a predetermined level.

Disconnection means 404 may reconnect the exhaust brake actuation system 400 with the source 100 upon communication from the sensing means 402 that the sensed parameter has reattained an acceptable level.

Figure 2:
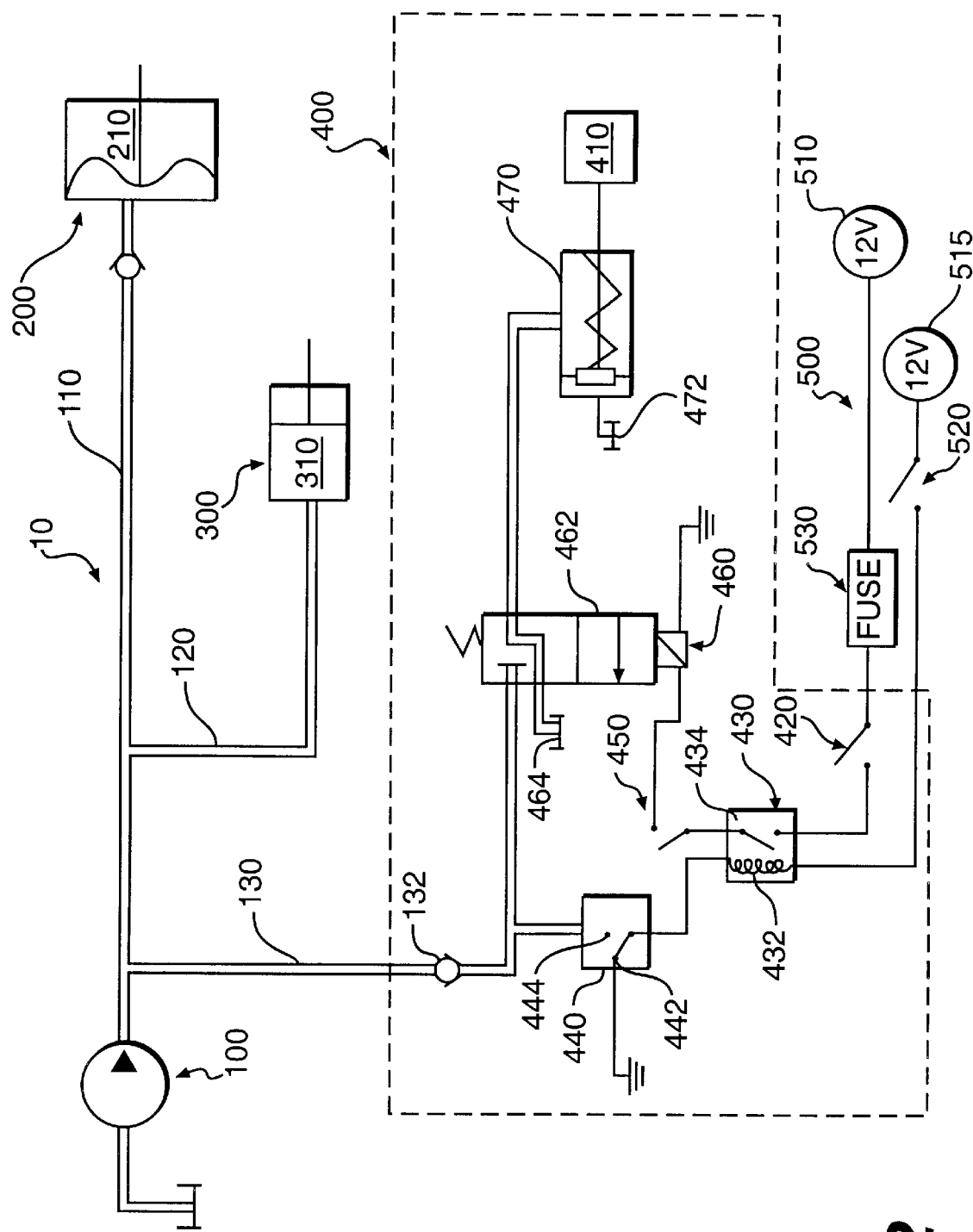
FIG. 2 is a schematic diagram of a preferred embodiment of the pneumatic and electrical systems of the invention.

With reference to FIG. 2, in which a preferred embodiment of the invention is shown, the system 10 may be provided in a vehicle having vacuum operated service brake system 200 and a vacuum operated exhaust brake actuation system 400. The vacuum supply and actuation system 10 may include a vacuum pump 100 for providing a vacuum via three conduits 110, 120 and 130, respectively, to the service brake assist system 200 (including power booster 210), a heating and air conditioning system 300, and the exhaust brake actuation system 400. As in the previously described embodiment, the service brakes, exhaust brake and heating and air conditioning systems may draw varying amounts of vacuum depending upon operation levels and operation times.

Furthermore, because the service brake assist system 200, the heating and air conditioning system 300 and the actuation system 400 are in common pneumatic communication with the pump 100, the magnitude of vacuum available for each is dependent upon (i) the vacuum draw of the others, and (ii) the operating altitude of the vehicle in which the systems are disposed. The higher the operating altitude, the lower the magnitude of vacuum that can be provided by the pump 100, the greater the pump pull down time, and therefore the less vacuum available for the systems to share.

Turning to the exhaust brake actuation system 400 shown in FIG. 2, the actuation system 400 may be operated with the application of a voltage from a vehicle electrical system 500. The electrical system may include a first voltage source 510, such as a vehicle battery, connected to a fuse 530. The fuse 530 is provided for safety reasons, as it will disable the exhaust brake system should there be a short circuit in the system. The electrical system 500 may also include a second voltage source 515, which may be of considerably lower amperage than the first voltage source 510. The second voltage source may be connected to the exhaust brake actuation system 400 via an ignition switch 520.

Activation of the exhaust brake 410 may be initiated by closing the brake activation switch 420 and the ignition switch 520. Once the ignition switch 520 and the brake activation switch 420 are closed, a voltage is applied across a coil 432 in a time delay relay 430. The voltage in the coil 432 may create an electromagnetic field which results in the closing of the relay switch 434 and the application of a voltage through a fuel pump activation switch 450 to a solenoid 460. The fuel pump activation switch is open when fuel is being supplied to the engine and closed when fuel supply is interrupted (i.e. when exhaust braking may be desired). Activation of the voltage to the solenoid 460 in turn may actuate an associated solenoid driven valve 462 to place the exhaust brake vacuum actuator 470 in communication with the conduit 130 providing connection past a check valve 132 to a vacuum source 100.

Application of the vacuum from pump 100 to the vacuum actuator 470 may cause a valve in the exhaust brake 410 to close. In the preferred embodiment, the valve in the exhaust brake may be a butterfly valve, although it is contemplated that various other valves, known to those of ordinary skill in the art, could be used in place of a butterfly valve.

The voltage in the coil 432 may be maintained by it being applied to ground through a ground post 442 in a cut-off switch 440. An exemplary cut-off switch may be provided by a Whitman controls pressure switch, Model P119. The cut-off switch 440 may be in communication with the conduit 130 and may monitor or sense a vacuum parameter such as the magnitude of the vacuum present in the conduit 130 and/or the rate of change of the vacuum magnitude in the conduit 130.

In the embodiment of the invention in which vacuum magnitude is sensed, if the vacuum in the conduit 130 falls below a predetermined level, such as approximately 15 inches of mercury (InHg) in a preferred embodiment, then the cut-off switch is activated to break the electrical connection between the coil 432 and the ground post 442. If the vacuum does not regain a second predetermined level (approximately 16.5 InHg in the preferred embodiment) within a predetermined time (set by the time delay relay 430), then the diminishment of the voltage in the coil 432 may cause the relay switch 434 to open. The predetermined time may be in the range of 0.25 to 10 seconds, and more preferably in the range of 2–5 seconds. Opening of the relay switch 434 may result in a disruption of the application of voltage to the solenoid 460, causing the valve 462 to close, and causing a consequent disconnection of the vacuum actuator 470 from the conduit 130. When the valve 462 is closed, the vacuum actuator 470 may be put in communication with vents 464 and 472 to the atmosphere.

Should the vacuum in conduit 130 subsequently attain a satisfactory magnitude, the cut-off switch 440 may be closed, the coil 432 reenergized, and the solenoid 460 opened to provide vacuum communication between the conduit 130 and the vacuum actuator 470.

The opening of the circuit by the cut-off switch 440 may be selectively set to result from the magnitude of the vacuum in conduit 130 falling below any level within a wide range. The exemplary level of 15 InHg is disclosed as providing a good cut-off level for safe operation of vehicle engines and exhaust braking systems therefor at various altitudes. The precise magnitudes of the first and second predetermined vacuum levels may be varied to provide selective levels of safe braking operation and selective exhaust brake/service brake operating characteristics. For example, the predetermined vacuum levels may be raised to provide an extra margin of safety. The first and second predetermined vacuum levels also may be substantially the same in some circumstances.

The time delay relay 430 may be selectively set to prevent the opening of the switch 434 unless the cut-off switch 440 remains open for a predetermined period of time. This "delay" feature of the relay 430 prevents the switch 434 from opening as a result of the routine occurrence of short duration drops in vacuum level at the beginning of the application of the service brakes or at the beginning of the operation of some other vacuum consuming system.

With continued reference to FIG. 2, in the embodiment of the invention in which vacuum pull down rate or flow rate is sensed, if the vacuum in the conduit 130 is not attained at or above a predetermined rate, such as approximately three (3) inches of mercury (InHg) per second or greater in a preferred embodiment, then the cut-off switch may break the electrical connection between the coil 432 and the ground post 442. Following the breaking of the electrical connection by the cut-off switch, the operation of the actuation system is practically the same for the vacuum pull down rate embodiment as it is for the vacuum magnitude embodiment. One difference being that the timer delay relay 430 will prevent opening of the switch 434 depending upon the vacuum pull down rate rather than depending upon resumption of a predetermined vacuum magnitude in the conduit 130.

In the vacuum pull down rate embodiment, the time delay relay 430 may prevent the switch 434 from opening as a result of the routine occurrence of short duration vacuum decreases at the beginning of the application of the service brakes.

Fuel pump activation switch 450 may provide additional control over the vacuum communication between conduit 130 and the vacuum actuator 470. Activation of the fuel pump, which may indicate the engine is about to undergo positive power and that exhaust braking should be discontinued, results in the fuel pump activation switch 450 being opened and the voltage connection to the solenoid 460 being broken. Breaking of the voltage connection to the solenoid results in the closing of the valve 462 and disconnection of the communication between the vacuum actuator 470 and conduit 130.

It will be apparent to those skilled in the art that various modifications and variations can be made in the construction, configuration, and/or operation of the present invention without departing from the scope or spirit of the invention. For example, in the embodiments mentioned above, the vacuum magnitudes and pull down rates which may trigger the cut-off switch 440 may vary from engine to engine and vehicle to vehicle. Further, the system 10 may include additional or fewer vacuum driven subsystems without departing from the scope of the invention, so long as there is at least one other vacuum driven subsystem in addition to a vacuum driven exhaust brake actuation system. Still further, vacuum magnitude may be sensed at almost any point in the vacuum supply system. For example, vacuum level may alternatively be sensed in the power booster 210 of the service brake assist system. Thus, it is intended that the present invention cover the modifications and variations of the invention provided they come within the scope of the appended claims and their equivalents.

I claim:

1. A vacuum actuation system in a vehicle for providing actuation of an exhaust brake and at least one other vehicle subsystem, comprising:

means for sensing a parameter indicating the magnitude of available vacuum actuation; and means for selectively isolating the exhaust brake from the vacuum actuation system responsive to the parameter sensed by the means for sensing.

2. In a vehicle pneumatic system in communication with vacuum assisted service brakes and an exhaust brake, a system for selectively isolating the exhaust brake from a vacuum source, comprising:

means for sensing a parameter of the available vacuum provided by the vacuum source; and means for selectively isolating the exhaust brake from the vacuum source responsive to the vacuum parameter sensed by the means for sensing.

3. The system of claim 2 wherein the vacuum parameter is the magnitude of the available vacuum.

4. The system of claim 3 wherein:

the means for isolating comprises a solenoid valve, said solenoid valve being electrically connected to a voltage source and providing pneumatic communication between the vacuum source and the exhaust brake; and the means for sensing comprises an electrical cut-off switch, said cut-off switch being capable of disconnecting said solenoid valve from said voltage source responsive to the magnitude of available vacuum to thereby close said solenoid valve and isolate the vacuum source from the exhaust brake.

5. The system of claim 4 wherein the electrical cut-off switch is adapted to disconnect said solenoid valve from said voltage source responsive to the available vacuum falling below a magnitude of approximately fifteen (15) inches of mercury.

6. The system of claim 4 wherein the means for isolating further comprises means for disconnecting said solenoid valve from said voltage source responsive to the magnitude of available vacuum remaining below a predetermined magnitude for a predetermined duration of time.

7. The system of claim 6 wherein said means for disconnecting comprises a time delay relay including an induction coil and an electromagnetically operated switch.

8. The system of claim 6 wherein said means for disconnecting is adapted to disconnect said solenoid valve from said voltage source responsive to the available vacuum remaining below a magnitude of approximately sixteen and one half (16.5) inches of mercury for a predetermined time after the available vacuum falls below a magnitude of approximately fifteen (15) inches of mercury.

9. The system of claim 6 wherein the predetermined duration of time is in the range of approximately 0.25 to 10 seconds.

10. The system of claim 3 wherein said means for isolating is responsive to the magnitude of available vacuum falling below a first magnitude and remaining below a second magnitude for a predetermined time after falling below the first magnitude, and wherein the second magnitude is greater than the first magnitude.

11. The system of claim 2 wherein the vacuum parameter is vacuum flow rate.

12. The system of claim 2 wherein the vacuum parameter is vacuum pump pull down rate.

13. The system of claim 12 wherein said means for isolating is adapted to isolate the vacuum source from the exhaust brake if the pull down rate is less than three (3) inches of mercury per second.

14. The system of claim 12 wherein:

the means for isolating comprises a solenoid valve, said solenoid valve being electrically connected to a voltage source and providing pneumatic communication between the vacuum source and the exhaust brake; and the means for sensing comprises an electrical cut-off switch, said cut-off switch being capable of disconnecting said solenoid valve from said voltage source responsive to the pull down rate of the vacuum pump to thereby close said solenoid valve and isolate the vacuum source from the exhaust brake.

15. The system of claim 2 wherein the exhaust brake comprises a butterfly valve and a pneumatic butterfly valve actuator.

16. In a vehicle pneumatic system including a vacuum source, vacuum assisted service brakes and a vacuum operated exhaust brake, a method of providing selective pneumatic communication between the vacuum source and the exhaust brake comprising the steps of:

sensing a parameter of the vacuum provided by the vacuum source; and selectively disabling pneumatic communication between the vacuum source and the exhaust brake responsive to the sensed vacuum parameter.

17. The method of claim 16 wherein the vacuum parameter is vacuum magnitude.

18. The method of claim 17 wherein the step of sensing comprises sensing an average vacuum magnitude over a predetermined time period.

19. The method of claim 17 wherein said step of selectively disabling comprises selectively disabling pneumatic communication between the vacuum source and the exhaust brake responsive to the vacuum magnitude falling below a predetermined level.

20. The method of claim 16 further comprising the step of selectively enabling pneumatic communication between the vacuum source and the exhaust brake responsive to the vacuum parameter attaining a predetermined level.

21. The method of claim 16 wherein the vacuum parameter is pull down rate of the vacuum source.

22. The method of claim 16 wherein the vacuum parameter is sensed in a conduit connecting the vacuum source and the exhaust brake.

23. The method of claim 16 wherein the vacuum parameter is sensed in a power booster reservoir of the service brake.

24. In a vehicle pneumatic system including a vacuum source, vacuum assisted service brakes and a vacuum operated exhaust brake, a method of safely operating said pneumatic system and service brakes comprising the step of:

selectively disabling pneumatic communication between the vacuum source and the exhaust brake responsive to the level of vacuum provided by the vacuum source.

* * * * *